United States Patent
Chang (10) Patent No.: US 7,983,551 B2
(45) Date of Patent: Jul. 19, 2011

(54) LENS ACTUATOR AND CAMERA SYSTEM HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/484,994

(22) Filed: Jun. 15, 2009

(65) Prior Publication Data

US 2010/0033822 A1    Feb. 11, 2010

(30) Foreign Application Priority Data

Aug. 8, 2008  (CN) .......................... 2008 1 0303606

(51) Int. Cl.
*G03B 3/10* (2006.01)
(52) U.S. Cl. ........................................ 396/133
(58) Field of Classification Search .................. 396/133
See application file for complete search history.

(56) References Cited

U.S. PATENT DOCUMENTS

| 6,011,927 | A | * | 1/2000 | Kamata ........................... 396/55 |
| 6,587,270 | B2 | * | 7/2003 | Terada ........................... 359/554 |
| 7,400,463 | B1 | * | 7/2008 | Wu ................................. 359/824 |
| 7,463,436 | B2 | * | 12/2008 | Takahashi et al. ............. 359/824 |
| 2005/0270380 | A1 | * | 12/2005 | Tomita et al. ............. 348/208.99 |
| 2006/0153556 | A1 | * | 7/2006 | Lee et al. ....................... 396/133 |
| 2006/0257131 | A1 | * | 11/2006 | Yoon et al. ................... 396/133 |
| 2009/0310959 | A1 | * | 12/2009 | Shih et al. ..................... 396/529 |
| 2010/0080545 | A1 | * | 4/2010 | Fan et al. ......................... 396/55 |

* cited by examiner

*Primary Examiner* — Rodney E Fuller
(74) *Attorney, Agent, or Firm* — Raymond J. Chew (57) ABSTRACT

An exemplary lens actuator includes a fixed unit, a movable unit, and a connecting member for connecting the fixed unit with the movable unit. The fixed unit includes a fixed barrel and a plurality of magnets mounted on the fixed barrel. The fixed barrel includes a first receiving cavity in a center thereof for receiving the movable unit therein. The movable unit includes a lens barrel, and a plurality of coils connected with the outer wall of the lens barrel and facing the respective magnets.

20 Claims, 9 Drawing Sheets

LENS ACTUATOR AND CAMERA SYSTEM HAVING SAME

BACKGROUND

1. Technical Field

The present disclosure relates to lens actuators, and particularly to voice coil motor type lens actuators, and camera systems with the lens actuators.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without changing lenses.

Generally, an optical system includes an actuator, such as a step motor, to drive the lenses. However, the step motor is relatively large in volume. Use of the step motor requires a significant amount of space, which makes the optical system bulky. Meanwhile, the optical system may subject to unintentional vibrations (e.g. shakes by the users) during use, such that the optical system may need more mechanical members to stabilize an image.

Therefore, what is needed is a lens actuator adapted for driving the lenses with more compact structure, and a camera system with the lens actuator which may stabilize an image during use.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
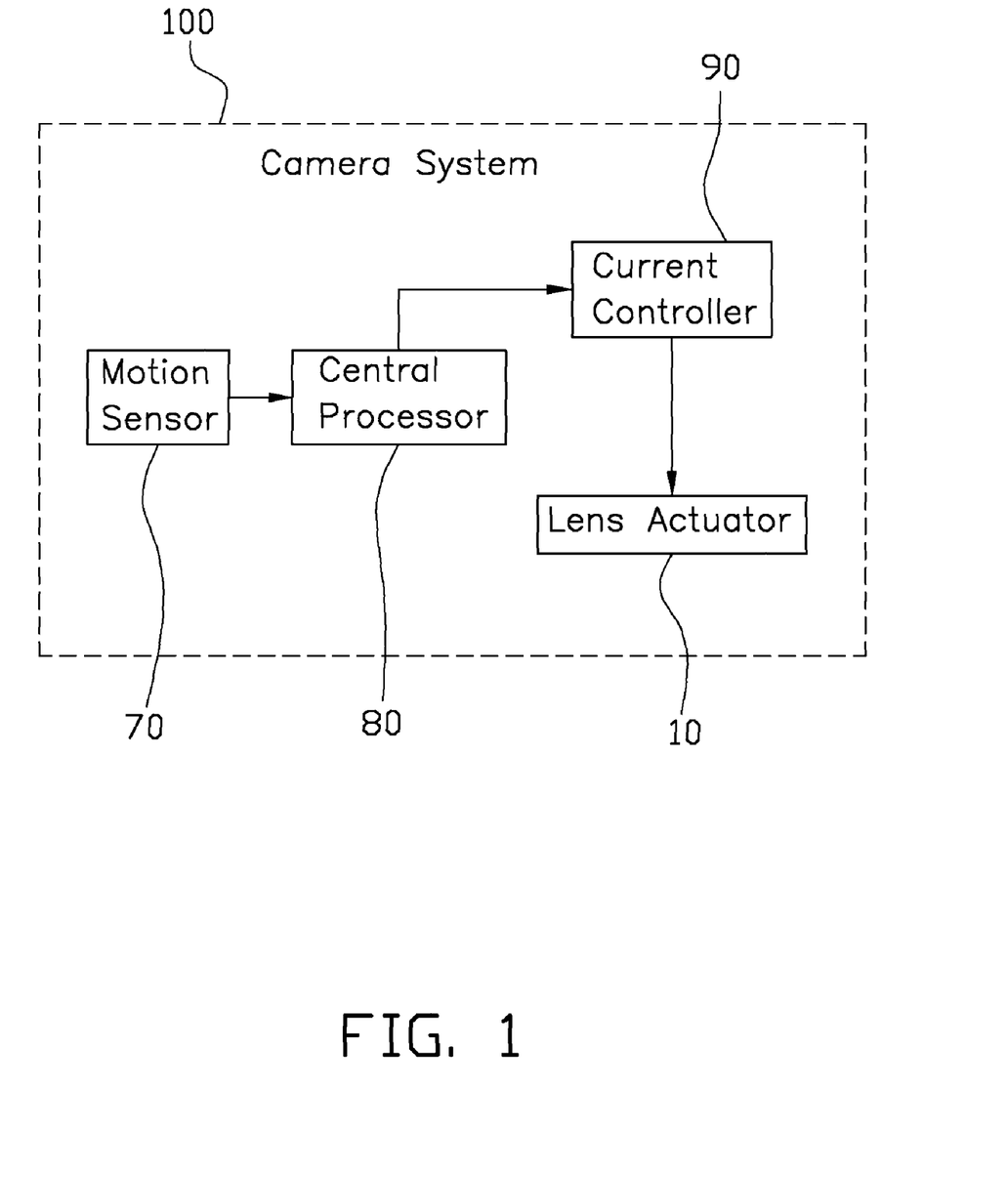
FIG. 1 is a block diagram of a camera system for stabilizing an image during use according to a first embodiment, the camera system including a voice coil motor type lens actuator.

Referring to FIG. 1, a camera system 100, in accordance with a first embodiment, includes a lens actuator 10, a motion sensor 70, a central processor 80, and a current controller 90.

Figure 2:
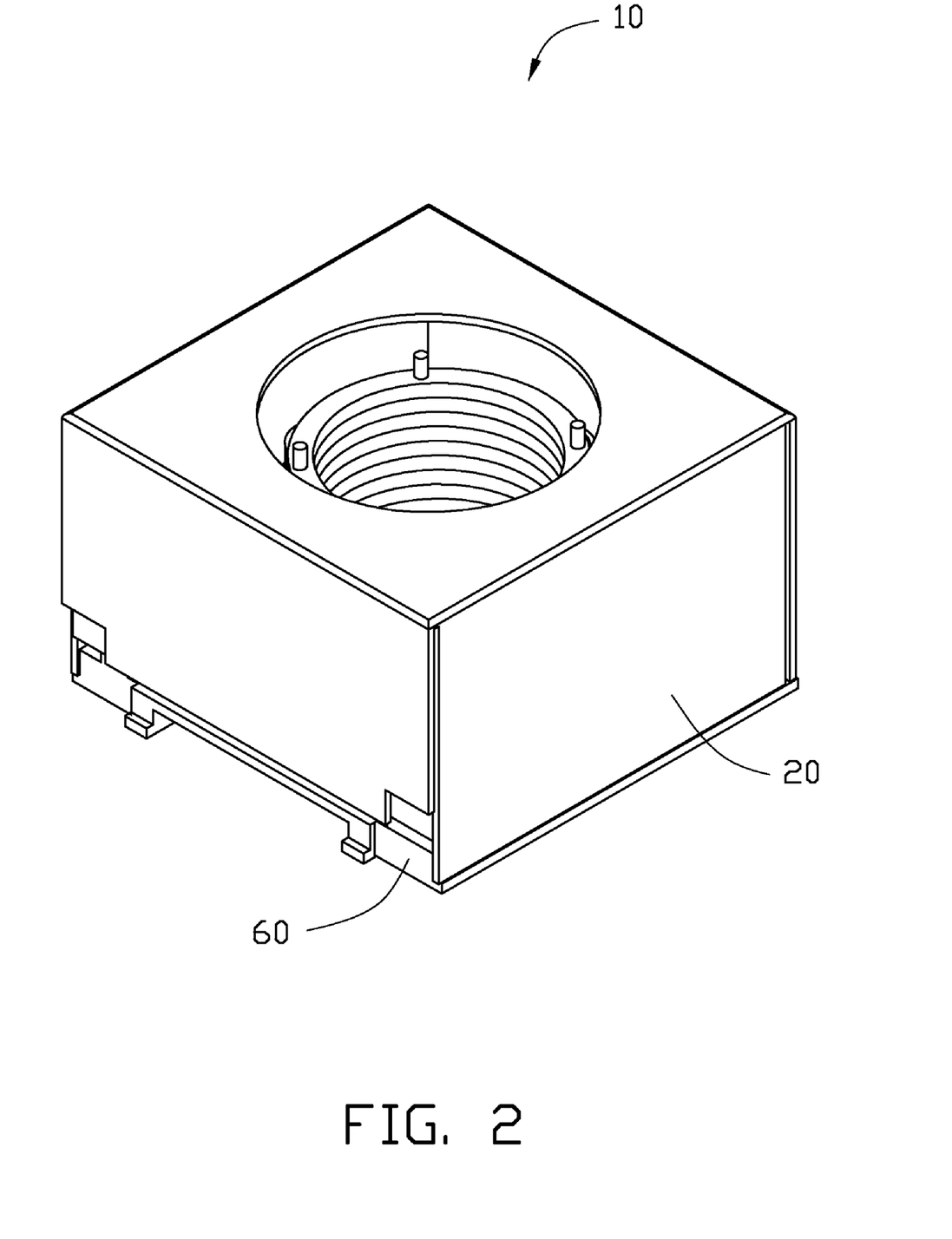
FIG. 2 is a schematic, isometric view of the voice coil motor type lens actuator shown in FIG. 1.
Figure 3:
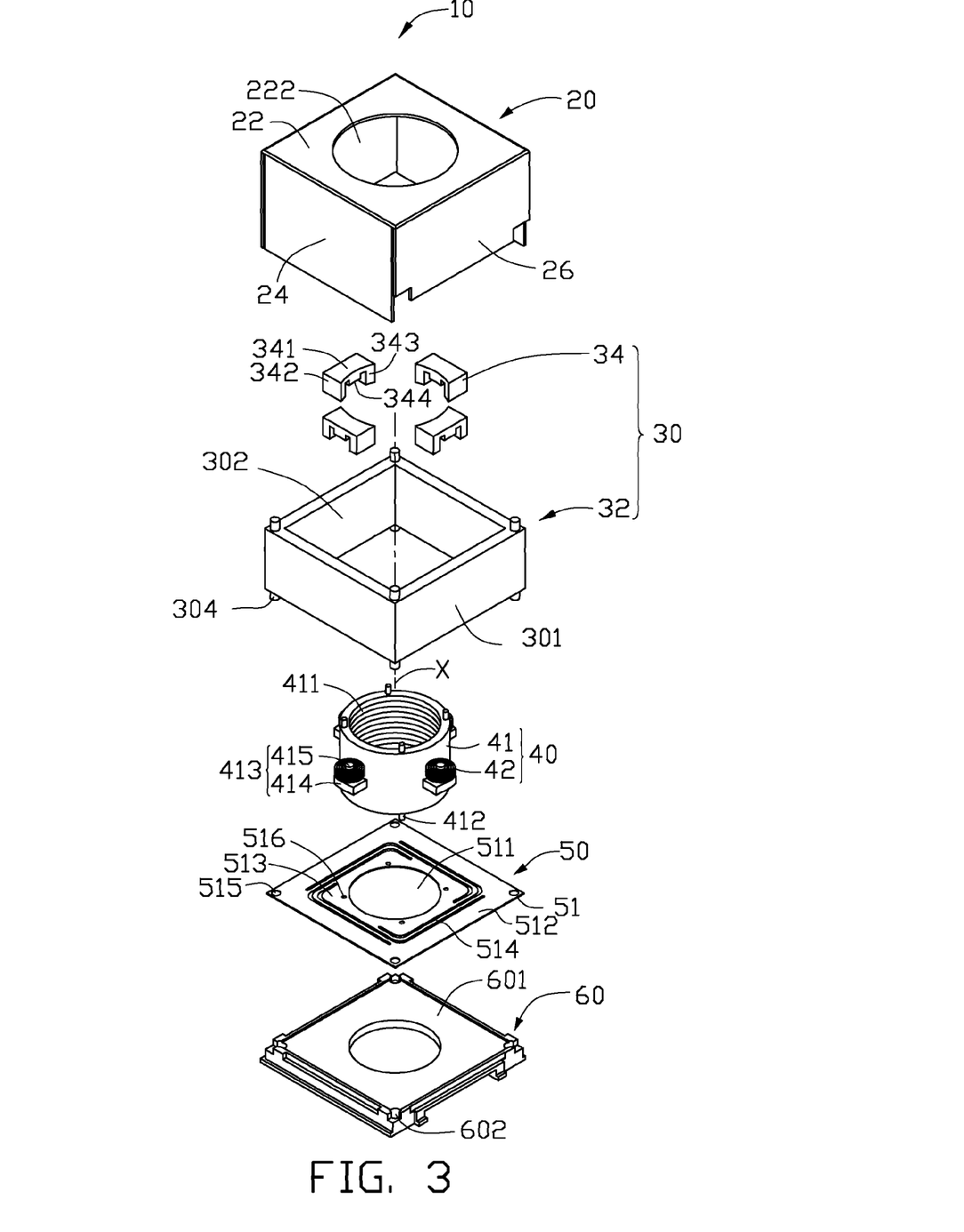
FIG. 3 is an exploded view of the voice coil motor type lens actuator shown in FIG. 2, the lens actuator including a fixed unit and a movable unit.

Referring also to FIGS. 2-3, the lens actuator 10 includes a housing 20, a fixed unit 30, a movable unit 40, a connecting member 50, and a board 60.

The housing 20 includes a roof plate 22, a through hole 222 defined in a center of the roof plate 22, two opposite first side plates 24 and two opposite second side plates 26. The two opposite first side plates 24 and two opposite second side plates 26 respectively perpendicularly extend from the four outer sides of the roof plate 22 and are respectively fastened to one another by a dovetail panel joint (not shown). The roof plate 22, the first side plates 24, and the second side plates 26 cooperatively define a cavity for accommodating the fixed unit 30. The housing 20 may be made of electromagnetic shield material, such as ferronickel alloy, electrically conductive plastic, surface conductive material, electrically conductive glass, etc.

The fixed unit 30 includes a cubic fixed barrel 32 and a plurality of magnets 34 mounted on the cubic fixed barrel 32. The cubic fixed barrel 32 includes four square side walls 301. A first receiving cavity 302 for receiving the movable unit 40 therein is cooperatively defined by the four square side walls 301. Four first locating pins 304 perpendicularly protrude from the bottom side of the cubic fixed barrel 32 at each corner thereof. The first locating pins 304 are configured for locating and fastening the fixed unit 30 to the board 60. In this embodiment, the number of the magnets 34 corresponds to that of the side walls 301. The magnets 34 are respectively mounted on the inner surface of the respective side walls 301, and arranged symmetrically around a central axis X of the cubic fixed barrel 32. The central axes of magnets 34 are parallel with the central axis X of the cubic fixed barrel 32.

The shape of the cross section of the fixed barrel 32 may be round, triangle, pentagonal or hexagonal, etc.

Each magnet 34 includes a plate body 341, a first part 342, a second part 343 parallel with the first part 342, and a third part 344 parallel with and between the first and second parts 342, 343. The first and second parts 342, 343 respectively perpendicularly extend from opposite ends of the plate body 341. The first part 342 has the same magnetic pole as the second part 343. The third part 344 is formed on the plate body 341. The magnetic pole of the third part 344 is different from that of the first part 342. The first part 342 has the same length as the second part 343, and has the length greater than that of the third part 344 to reduce or even eliminate possibility of magnetic flux leakage. In this embodiment, the magnetic pole of the first part 342 is north pole, the magnetic pole of the third part 344 is south pole. In other embodiment, the magnet 34 can instead be strip magnet.

Figure 4:
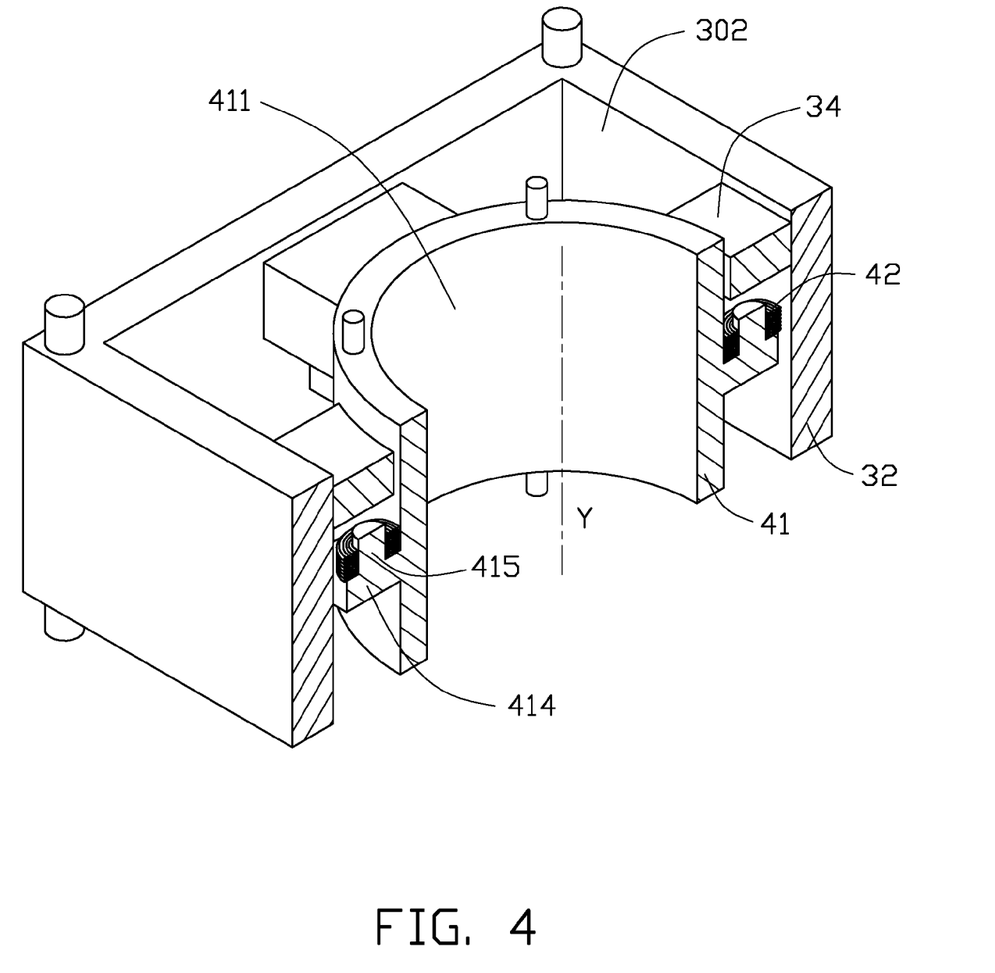
FIG. 4 is a schematic, cross-sectional isometric view of the fixed unit and the movable unit of FIG. 3, showing the movable unit received in the fixed unit.

Referring also to FIG. 4, the movable unit 40 includes a lens barrel 41 and a plurality of coils 42. The movable unit 40 is received in the first receiving cavity 302 and may be movable relative to fixed barrel 32. The lens barrel 41 defines a second receiving cavity 411 in a center of the lens barrel 41 for receiving lenses and filters (not shown) therein. Four second locating pins 412 perpendicularly protrude from the bottom side of the lens barrel 41. The second locating pin 412 is configured for locating and fastening the lens barrel 41 to the connecting member 50. The number of the coils 42 corresponds to that of the magnets 34.

The lens barrel 41 also includes a plurality of connecting parts 413 mounted on the outer wall of the lens barrel 41. The number of containing parts 413 corresponds to that of the coils 42. Each connecting part 413 includes a support plate 414 mounted on the outer wall of the lens barrel 41, and a fixed cylinder 415 mounted on the support plate 414. The fixed cylinders 415 arranged symmetrically around a central axis Y of the lens barrel 41. The fixed cylinders 415 are respectively coaxial with the corresponding magnets 34 (i.e. the fixed cylinders 415 are parallel with the central axis X of the cubic fixed barrel 32), and face the third part 344 of the magnet 34. The coils 42 are wrapped around the outer walls at the respective fixed cylinders 415. That is, the coils 42 are respectively wound on the corresponding fixed cylinders 415 in the direction parallel with the central axis X of the cubic fixed barrel 32. In this embodiment each coil 42 is coaxial with the corresponding magnet 34.

The connecting member 50 is a flat spring plate, and includes a flat plate 51. In this embodiment, the flat plate 51 is square shaped. The flat plate 51 defines a through hole 511 in a center thereof for allowing light to pass therethrough. The flat plate 51 includes an inner frame 513 surrounding the through hole 511, an outer frame 512 surrounding the inner frame 513, and a plurality of spring parts 514 interconnected between the outer frame 512 and the inner frame 513. The outer frame 512 is far away from the through hole 511. The inner frame 513 is near to the through hole 511. Each spring part 514 connects the outer frame 512 with the inner frame 513.

The outer frame 512 defines four holes 515 in four corners corresponding to the respective first locating pins 304. The outer frame 512 is fastened to the bottom side of the cubic fixed barrel 32 by engagement of the holes 515 with the respective first locating pins 304.

The inner frame 513 defines four holes 516 corresponding to the respective second locating pins 412. The inner frame 512 is fastened to the bottom side of the lens barrel 41 by engagement of the holes 516 with the respective second locating pins 412.

The board 60 and the housing 20 cooperatively define a receiving cavity (not shown) for receiving the fixed unit 30, the movable unit 40, and the connecting member 50 therein. The board 60 includes a supporting surface 601 for supporting the second locating pins 412, and four holes 602 in the corners corresponding to the respective first locating pins 304. The cubic fixed barrel 32 is fastened to board 60 by engagement of the holes 602 with the respective first locating pins 304.

When electric currents are applied to the coils 42, the coils 42 are excited to act upon the magnets 34, thereby receiving a magnetic force to drive the lens barrel 42 to linearly move along its central axis.

The motion sensor 70 is configured for sensing a movement of the movable unit 40 responding to a shake of the lens actuator 10 due to a vibration of the camera system 100 and generating signals associated therewith. The central processor 80 is configured for receiving signals from the motion sensor 20, and generating an image stabilizing signal based on the signals from the motion sensor 20. The current controller 90 is configured for receiving the image stabilizing signal from the central processor 80, and accordingly controlling a movement of the movable unit 40 in response to the image stabilizing signal to make the movable unit 40 coaxial to the fixed unit 30.

Figure 5:
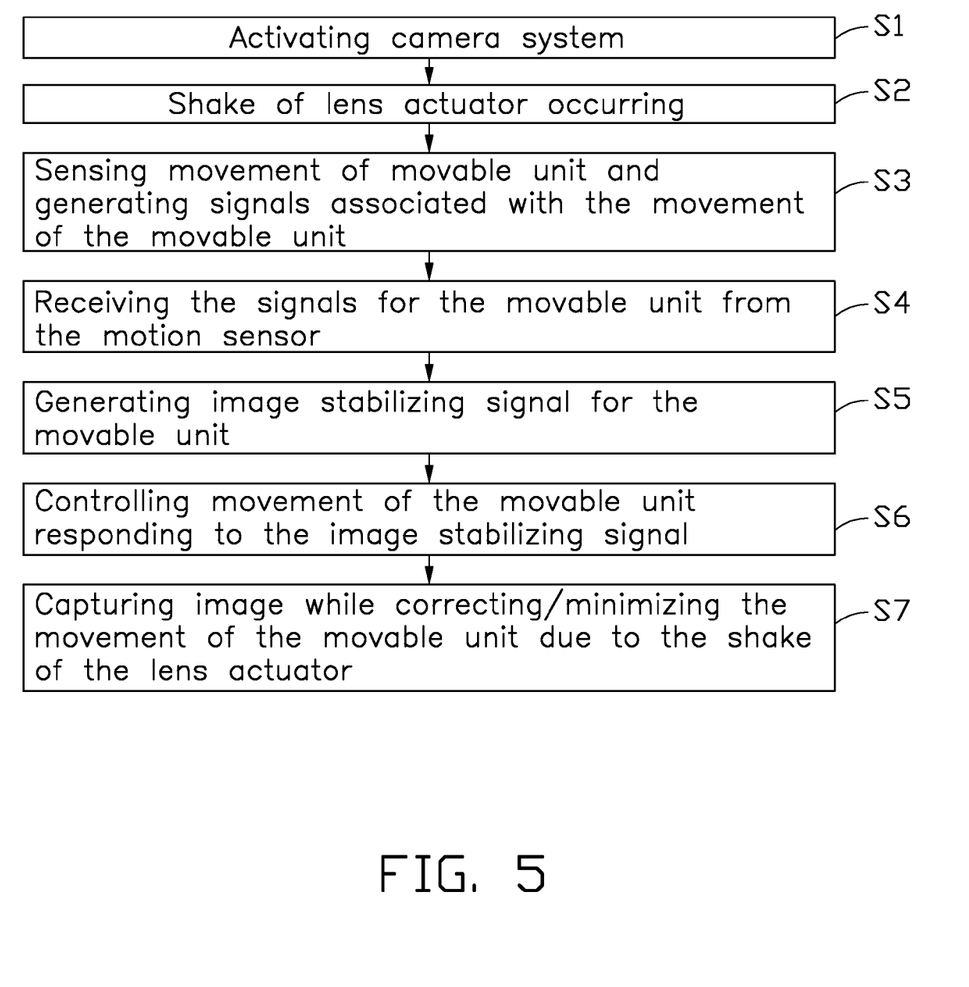
FIG. 5 is a flowchart showing exemplary operations which may be implemented during the camera system use for image stabilizing.

Referring also to FIG. 5, in step 1, the camera system 100 may be activated by a user. In step 2, the camera system 100 may be shaken slightly; then, the lens actuator 10 may shake with the camera system 100. In step 3, a movement of the movable unit 40 due to the shake of the lens actuator 10 may be sensed by the motion sensor 70, such as a gyroscope, and signals associated with the movement of the movable unit 40 may be generated by the motion sensor 70. In step 4, signals for the movement of the movable unit 40 from the motion sensor 70 may be sent to the central processor 80. In step 5, an image stabilizing signal for the movable unit 40 may be generated by the central processor 80. In step 6, a movement responding to the image stabilizing signal of the movable unit 40 may be controlled by the current controller 90 receiving the image stabilizing signal. In other words, the current controller 90 may apply electric currents in the respective coils 42 responsive to the image stabilizing signal to move the movable unit 40. In step 7, the movement of the movable unit 40 due to the shake of the lens actuator 10 can be corrected/minimized during imaging capturing to eliminate blur due to the shake of the lens actuator 10.

When the electric currents are cut off from the coils 42, the connecting member 50 impart a restoring force to the lens barrel 41, thereby returning the lens barrel 41 to its former position.

Furthermore, the housing 20 and the board 60 protect the lens barrel 41 and the image sensor against dust.

Figure 6:
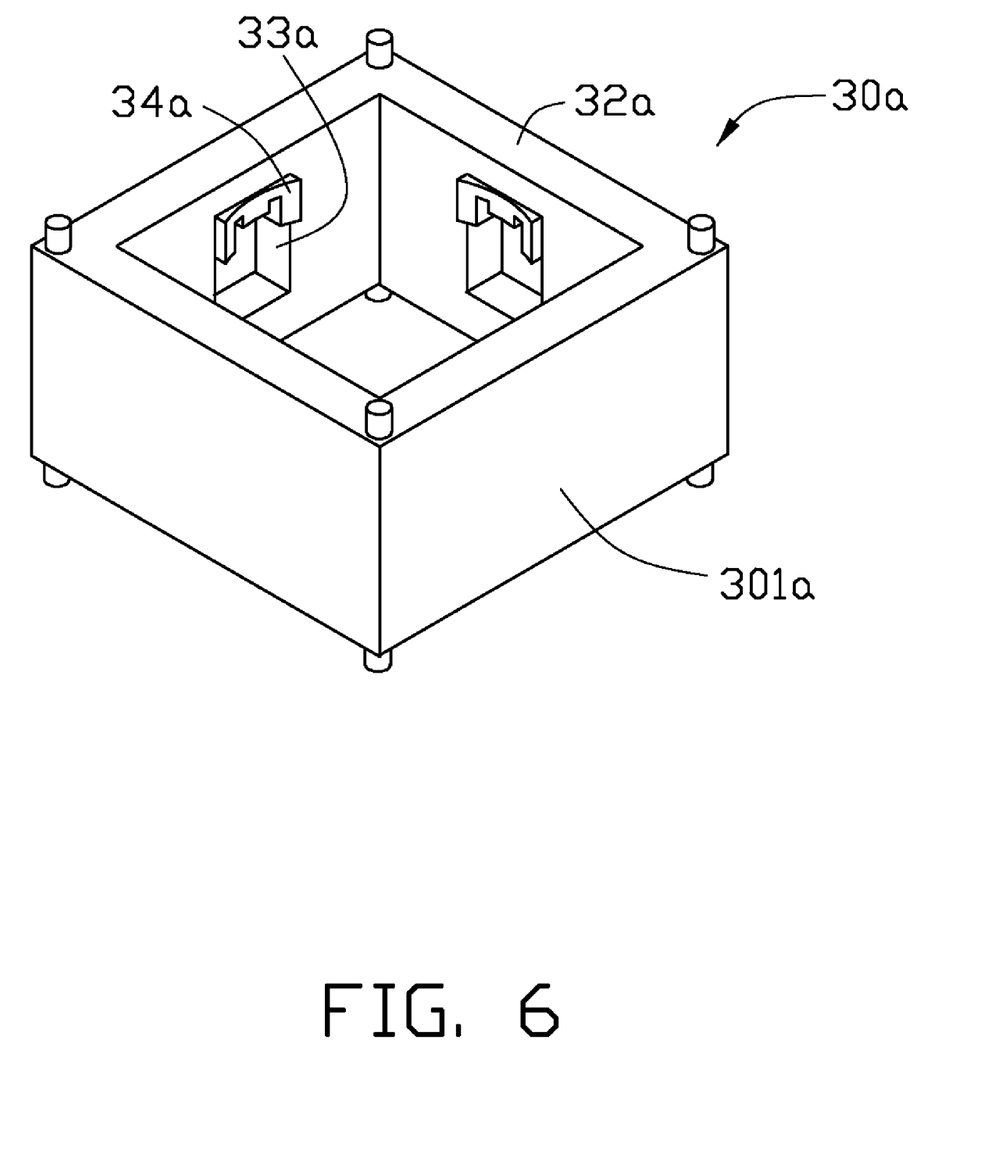
FIG. 6 is a schematic, isometric view of a fixed unit according to a second embodiment.

Referring to FIG. 6, a fixed unit 30a, in accordance with a second embodiment, includes a plurality of side walls 301a, and a plurality of magnets 34a mounted on the respective side walls 301a. Most of the structure of the fixed unit 30a is similar to that of the fixed unit 30, except that, the inner surface of the side wall 301a defines a receiving groove 33a thereon for receiving the magnet 34a therein.

Figure 7:
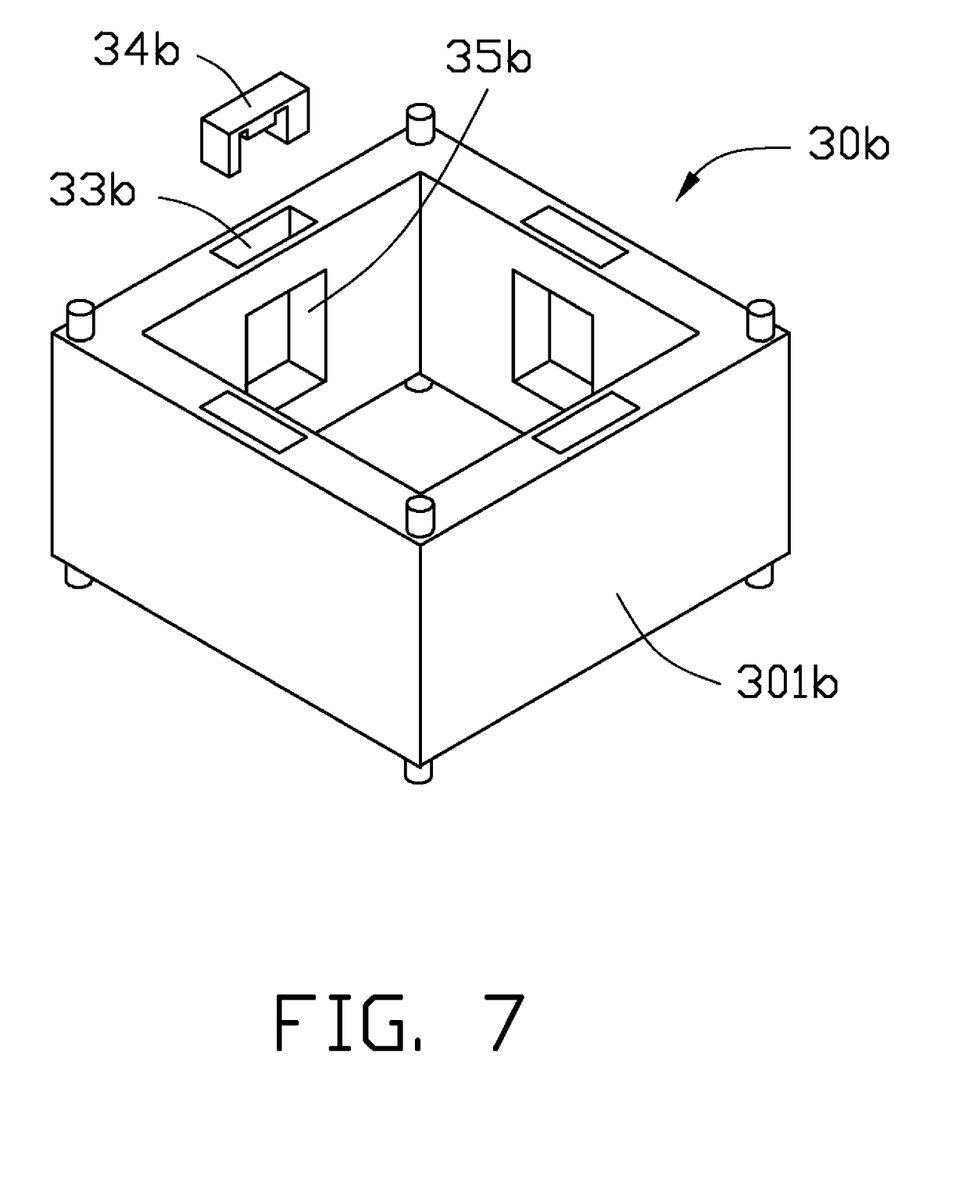
FIG. 7 is a schematic, isometric view of a fixed unit according to a third embodiment.

Referring to FIG. 7, a fixed unit 30b, in accordance with a third embodiment, includes a plurality of side walls 301b, and a plurality of magnets 34b mounted on the respective side walls 301b. Most of the structure of the fixed unit 30b is similar to that of the fixed unit 30a, except that, the top surface of the side wall 301b defines a receiving groove 33b, the inner surface of the side wall 301b defines an opening 35b thereon communicating with the receiving groove 33b. The receiving groove 33b is configured for receiving the magnet 34b therein. The opening 35b is configured for making the first receiving cavity 302 having stronger magnetic field therein.

Figure 8:
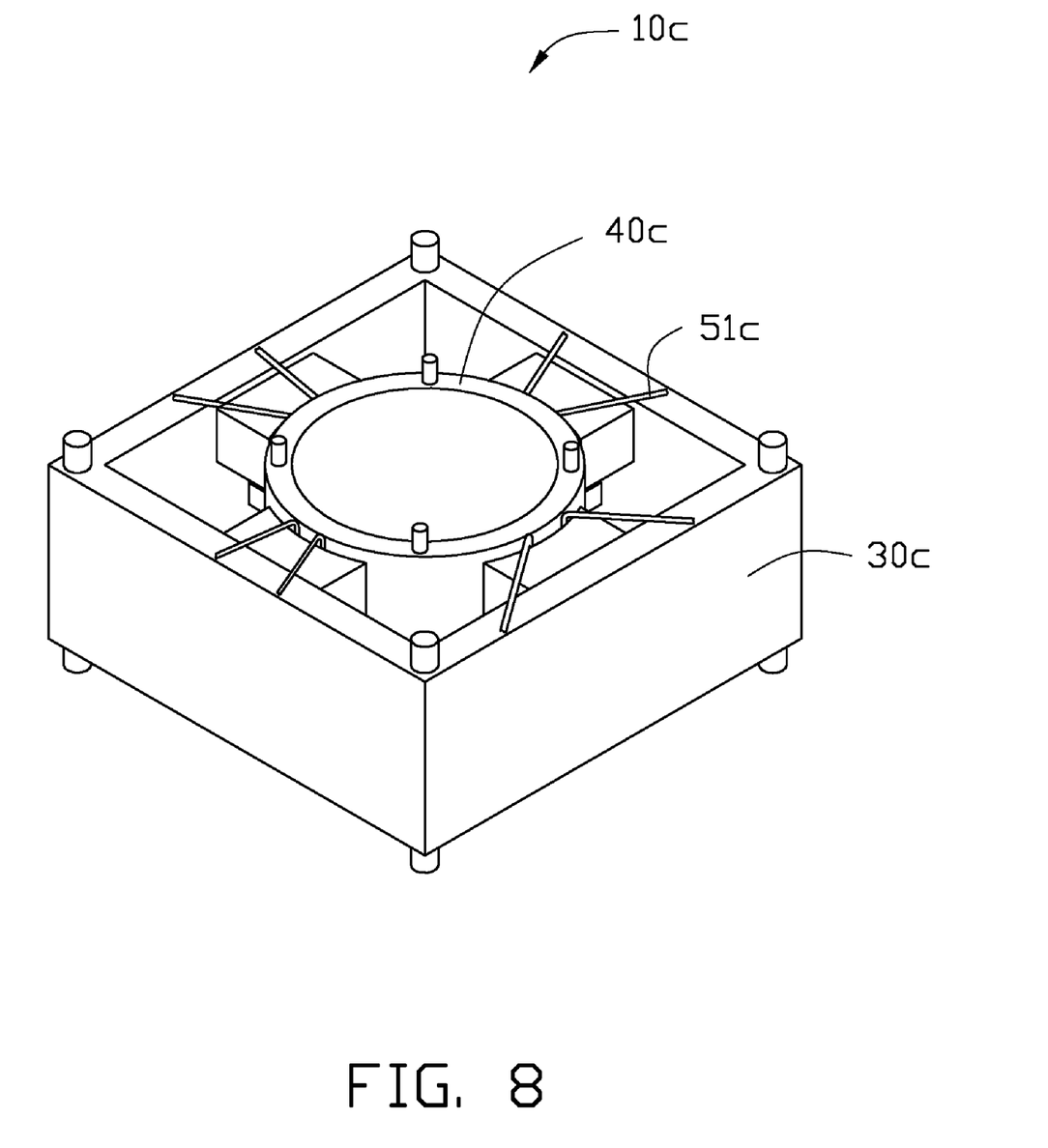
FIG. 8 is a schematic, isometric view of a lens actuator according to a fourth embodiment.
Figure 9:
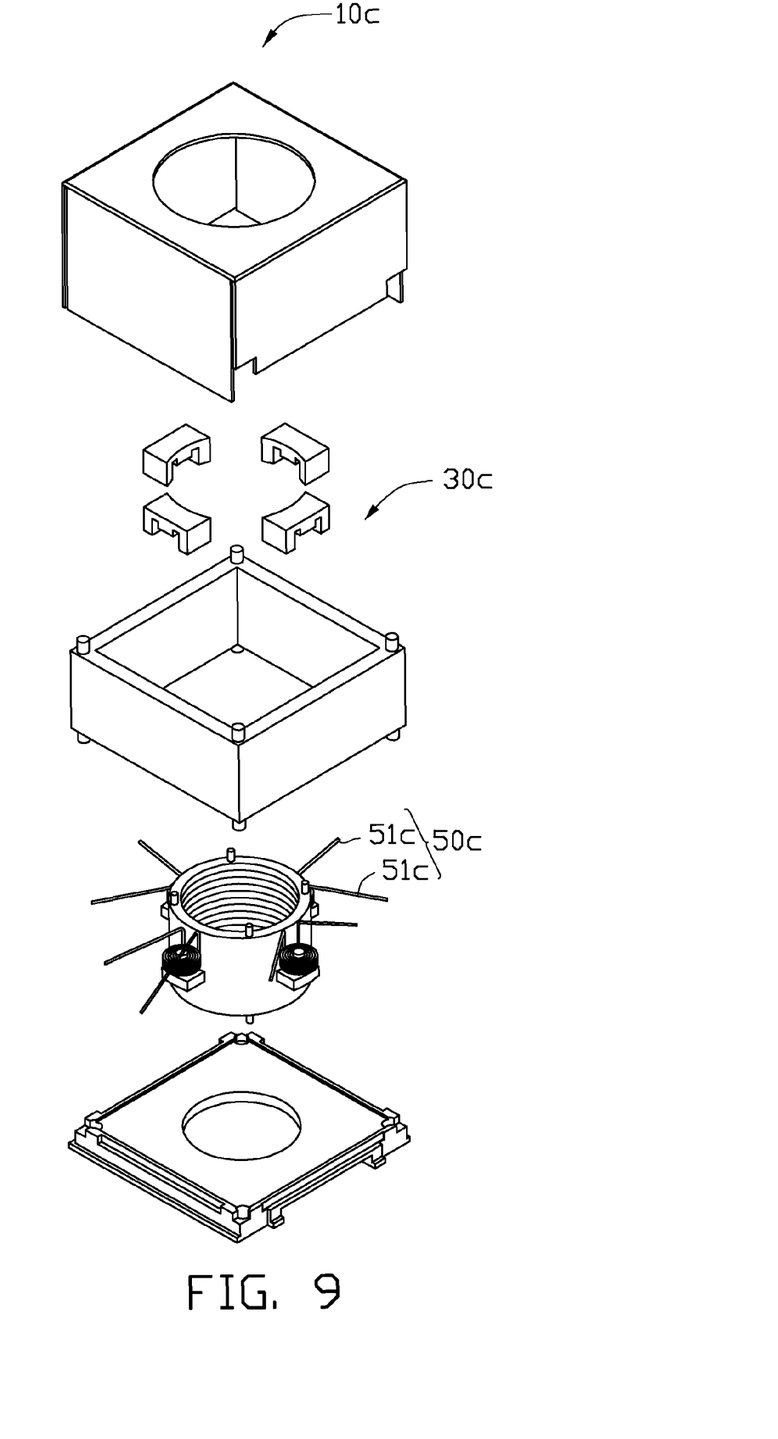
FIG. 9 is an exploded view of the lens actuator shown in FIG. 8.

Referring to FIGS. 8 and 9, a lens actuator 10c, in accordance with a fourth embodiment, includes a fixed unit 30c, a movable unit 40c, and a connecting member 50c. Most of the structure of the lens actuator 10c is similar to that of the lens actuator 10, except that, eight connecting wires 51 c cooperatively define the connecting member 50c, the connecting wire 51c is configured for connecting the movable unit 40c with the fixed unit 30c.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope of the appended claims.

What is claimed is:

1. A lens actuator comprising:
a fixed unit, the fixed unit comprising a fixed barrel and a plurality of magnets mounted on the fixed barrel, the fixed barrel comprising a first receiving cavity in a center thereof, the magnets arranged symmetrically around a central axis of the fixed barrel, each magnet comprising a plate body, a first part, a second part parallel with the first part, and a third part parallel with and between the first and second parts, the first and second parts respectively extending from opposite sides of the plate body, the first part having the same magnetic pole as the second part, the third part being formed on the plate body, and the magnetic pole of the third part being different from that of the first part;
a movable unit received in the first receiving cavity, the movable unit comprising a lens barrel, and a plurality of coils connected with the outer wall of the lens barrel and facing the respective magnets, the coils arranged symmetrically around the central axis of the lens barrel; and a plurality of connecting wires for connecting the fixed unit with the movable unit.

2. The lens actuator of claim 1, wherein the lens barrel further comprises a plurality of connecting parts mounted on the outer wall of the lens barrel, the number of connecting parts is the same as that of the coils, and the coils are mounted on the respective connecting parts.

3. The lens actuator of claim 2, wherein each connecting part comprises a support plate mounted on the outer wall of the lens barrel, and a fixed cylinder mounted on the support plate, the fixed cylinders are arranged symmetrically around the central axis of the lens barrel, each fixed cylinder is coaxial to the respective magnet, and faces the third part of the respective magnet, and each coil is wrapped around the outer wall of the respective fixed cylinder.

4. The lens actuator of claim 1, wherein the lens barrel comprises a plurality of fixed cylinders mounted on the outer wall thereof, the number of fixed cylinders is the same as that of the coils, the fixed cylinders are parallel with the central axis of the fixed barrel, and each of the coils is wound on the corresponding fixed cylinder in the direction parallel with the central axis of the fixed barrel.

5. The lens actuator of claim 4, wherein each fixed cylinder is coaxial with the respective magnet, and faces the third part of the respective magnet.

6. The lens actuator of claim 5, wherein the lens barrel further comprises a plurality of support plates mounted on the outer wall thereof, the number of support plates is the same as that of the coils, and each of the fixed cylinders is mounted on the corresponding support plate.

7. The lens actuator of claim 6, wherein the fixed barrel further comprises a plurality of side walls, and the magnets are mounted on the respective side walls.

8. The lens actuator of claim 7, wherein an inner surface of each side wall defines a receiving groove receiving the respective magnet therein.

9. The lens actuator of claim 7, wherein a top surface of each side wall defines a receiving groove receiving the respective magnet therein.

10. The lens actuator of claim 9, wherein an inner surface of each side wall defines an opening communicating with the respective receiving groove of the side wall.

11. A camera system, comprising:
a lens actuator, the lens actuator comprising a fixed unit, and a movable unit, the fixed unit comprising a fixed barrel and a plurality of magnets mounted on the fixed barrel, the fixed barrel comprising a first receiving cavity in a center thereof, the magnets arranged symmetrically around a central axis of the fixed barrel, the movable unit received in the first receiving cavity, the movable unit comprising a lens barrel, and a plurality of coils connected with the outer wall of the lens barrel and facing the respective magnets, the coils arranged symmetrically around the central axis of the lens barrel;
a motion sensor for sensing a movement of the movable unit due to a shake of the lens actuator and generating signals associated therewith; and
a central processor for receiving signals from the motion sensor, generating an image stabilizing signal based on the signals from the motion sensor, and controlling a movement of the movable unit in response to the image stabilizing signal to make the movable unit coaxial with the fixed unit.

12. The camera system of claim 11, wherein each magnet comprises a plate body, a first part, a second part parallel with the first part, and a third part parallel with and between the first and second parts, the first and second parts respectively extend from opposite sides of the plate body, the first part has the same magnetic pole as the second part, the third part is formed on the plate body, and the magnetic pole of the third part is different from that of the first part.

13. The camera system of claim 12, wherein the lens actuator further comprises-a plurality of connecting wires for connecting the fixed unit with the movable unit.

14. The camera system of claim 13, further comprising a current controller for receiving the image stabilizing signal from the central processor, wherein the current controller is configured for controlling electric currents in the respective coils in response to the image stabilizing signal in order to move the movable unit.

15. A lens actuator comprising:
a fixed unit, the fixed unit comprising a fixed barrel and a plurality of magnets mounted on the fixed barrel, the fixed barrel comprising a first receiving cavity in a center thereof, the magnets arranged symmetrically around a central axis of the fixed barrel, each magnet comprising a plate body, a first part, a second part parallel with the first part, and a third part parallel with and between the first and second parts, the first and second parts respectively extending from opposite sides of the plate body, the first part having the same magnetic pole as the second part, the third part being formed on the plate body, and the magnetic pole of the third part being different from that of the first part, and
a movable unit received in the first receiving cavity, the movable unit comprising a lens barrel, and a plurality of coils connected with the outer wall of the lens barrel and facing the respective magnets, the coils arranged symmetrically around the central axis of the lens barrel.

16. The lens actuator of claim 15, wherein the coils are coaxial with the respective magnets.

17. The lens actuator of claim 16, further comprising a plurality of connecting wires for connecting the fixed unit with the movable unit.

18. The lens actuator of claim 17, wherein the lens barrel further comprises a plurality of connecting parts mounted on the outer wall of the lens barrel, the number of connecting parts is the same as that of the coils, and the coils are mounted on the respective connecting parts.

19. The lens actuator of claim 18, wherein each connecting part comprises a support plate mounted on the outer wall of the lens barrel, and a fixed cylinder mounted on the support plate, the fixed cylinders are arranged symmetrically around the central axis of the lens barrel, each fixed cylinder is coaxial to the respective magnet, and faces the third part of the respective magnet, and each coil is wrapped around the outer wall of the respective fixed cylinder.

20. The lens actuator of claim 19, wherein the first part has the same length as the second part, the length of the first part is greater than that of the third part, the third part is parallel with the first part, and the central axis of the magnet is parallel with the central axis of the fixed barrel.

* * * * *